US011233368B2

(12) United States Patent
Kerstetter et al.

(10) Patent No.: US 11,233,368 B2
(45) Date of Patent: Jan. 25, 2022

(54) WIRE CLAMP (71) Applicant: TE CONNECTIVITY CORPORATION, Berwyn, PA (US)

(72) Inventors: Chadwick Alan Kerstetter, Richfield, PA (US); Richard R. Dobson, Jr., Palmyra, PA (US)

(73) Assignee: TE Connectivity Services GmbH

( * ) Notice: Subject to any disclaimer, the term of this patent is extended or adjusted under 35 U.S.C. 154(b) by 323 days.

(21) Appl. No.: 15/719,883

(22) Filed: Sep. 29, 2017

(65) Prior Publication Data
US 2019/0103718 A1   Apr. 4, 2019

(51) Int. Cl.
*H01R 43/048* (2006.01)
*H01R 43/058* (2006.01)
(Continued)

(52) U.S. Cl.
CPC ............. *H01R 43/048* (2013.01); *B25B 1/04* (2013.01); *B25B 1/20* (2013.01); *B25B 1/24* (2013.01); *B25B 1/2489* (2013.01); *B25B 5/04* (2013.01); *B25B 5/06* (2013.01); *H01R 43/04* (2013.01); *H01R 43/042* (2013.01);
(Continued)

(58) Field of Classification Search
CPC .. H01R 43/04; H01R 43/042; H01R 43/0424; H01R 43/045; H01R 43/048; H01R 43/0488; H01R 43/052; H01R 43/0585; H01G 1/1256; B25B 1/04; B25B 1/20; B25B 1/24; B25B 1/2489; B25B 5/04;
(Continued)

(56) References Cited

U.S. PATENT DOCUMENTS 4,480,460 A * 11/1984 Bush .................... H01R 43/042
29/751
4,707,913 A * 11/1987 Moline ................ H01R 43/048
29/566.2
(Continued)

FOREIGN PATENT DOCUMENTS

CN   104025403 A   9/2014
CN   105563371 A   5/2016
(Continued)

OTHER PUBLICATIONS

International Search Report, International Application No. PCT/IB2018/057417, International Filing Date Sep. 25, 2018.
(Continued)

*Primary Examiner* — A. Dexter Tugbang (57) ABSTRACT

A wire clamp includes a base and first and second jaws. The first jaw is pivotally mounted to a first upright portion of the base via a first pivot axle, and the second jaw is pivotally mounted to a second upright portion of the base via a second pivot axle. The first and second jaws crisscross each other at an overlap area, and are spring-biased to pivot relative to the base towards a closed position. Respective hook members of the first and second jaws define a mouth above the overlap area that is configured to receive a wire. A size of the mouth adjusts automatically to a size of the wire within the mouth as the first and second jaws pivot towards the closed position. The wire may be held within the mouth in an in-line orientation with a corresponding terminal to which the wire will be crimped.

20 Claims, 7 Drawing Sheets

(51) Int. Cl.
*B25B 1/04* (2006.01)
*B25B 5/06* (2006.01)
*B25B 5/04* (2006.01)
*H01R 43/052* (2006.01)
*H01R 43/045* (2006.01)
*H01R 43/042* (2006.01)
*H01R 43/04* (2006.01)
*B25B 1/20* (2006.01)
*B25B 1/24* (2006.01)
*H02G 1/12* (2006.01)

(52) U.S. Cl.
CPC ....... *H01R 43/045* (2013.01); *H01R 43/0424* (2013.01); *H01R 43/0488* (2013.01); *H01R 43/052* (2013.01); *H01R 43/0585* (2013.01); *H02G 1/1256* (2013.01); *Y10T 29/53235* (2015.01); *Y10T 29/53265* (2015.01)

(58) Field of Classification Search
CPC ................ B25B 5/06; Y10T 29/53235; Y10T 29/53265
See application file for complete search history.

(56) References Cited

U.S. PATENT DOCUMENTS

| | | | |
|---|---|---|---|
| 4,877,228 A | 10/1989 | Ripert | |
| 5,046,241 A * | 9/1991 | Ricard | H01R 43/0488 29/753 |
| 5,611,138 A * | 3/1997 | Krampe | H01R 43/045 140/121 |
| 5,890,280 A | 4/1999 | Matsuzawa | |
| 9,283,658 B2 | 3/2016 | Marple et al. | |
| 10,574,038 B2 | 2/2020 | Iwama | |

FOREIGN PATENT DOCUMENTS

| | | |
|---|---|---|
| CN | 106785495 A | 5/2017 |
| JP | 03-051657 A | 3/1991 |
| JP | 06-063885 U | 9/1994 |
| JP | 07-000035 U | 1/1995 |
| JP | 07-099007 A | 4/1995 |
| JP | 07-283199 A | 10/1995 |
| JP | 11-238118 A | 8/1999 |
| JP | 2014007043 A * | 1/2014 |

OTHER PUBLICATIONS

Chinese Search Report from First Office Action, Chinese Application No. 201880062900.5 dated Jan. 15, 2021.
Japanese Search Report from First Office Action, Japanese Application No. 2020-516889 dated Jun. 1, 2021.
Chinese Search Report from Second Office Action, Chinese Application No. 201880062900.5 dated Oct. 11, 2021.

* cited by examiner

WIRE CLAMP

BACKGROUND OF THE INVENTION

The subject matter herein relates generally to electrical terminal crimping systems that are used for crimping terminals to ends of wires, and, more specifically, to clamps for holding the wire in place as the wire is crimped to the terminal during a crimping operation.

Electrical terminals can be crimped to electrical conductors, such as electrical wires or cables, during a crimping operation to form an electrical lead. In electrical systems, electrical leads are used to provide an electrical signal path between two electrical components in the same or different electrical devices. The terminals are crimped to the conductors by a crimping machine, such as bench terminator or a lead-making machine. In a typical crimping operation, a terminal is placed in a crimping zone of the crimping machine and a wire is inserted into a ferrule or barrel of the terminal. Then, a ram of the crimping machine moves toward the terminal along a crimp stroke. The ram pinches or crimps the terminal around and onto the wire, which mechanically and electrically connects the wire to the terminal and forms the lead.

The forces exerted on the terminal and the wire by the ram and other components of the crimping machine during the crimping operation can be significant, even for relatively small wires and terminals. For crimping larger wires and terminals, the crimping machine exerts an even greater amount of force. The high forces may cause the wire to move out of position relative to the barrel of the terminal during crimping process, causing the wire to become misaligned with the terminal in the resulting electrical lead. For example, the wire can be pushed in an axial direction away from the crimping zone. The position and orientation of the wire relative to the terminal in the lead are important because production leads have to meet very strict crimp specifications. An electrical lead in which the wire is not properly located in the side-to-side (e.g., lateral), front-to-back (e.g., longitudinal), or top-to-bottom (e.g., vertical) directions relative to the terminal will not meet the crimp specifications, and will be discarded, draining both time and materials. To prevent misalignment caused by crimping forces, and thereby produce electrical leads that satisfy the specifications, the wire should be held in place at a location of the wire proximate to, but outside of, the crimping zone.

One apparent option for holding the wire in place would be for a user or operator to grasp the wire by hand. But, putting a hand near the crimping machine during operation of the crimping machine is not safe, and could result in serious injury to the user. To prevent such injuries to users, some crimping machines are fully guarded by a retractable shield that deploys when the crimping machine is operating to block a user from reaching into the crimping machine. Therefore, even if a user did attempt to hold the wire in place, the shield may obstruct the user from holding the wire proximate to the crimping zone.

A need remains for an easy-to-use device to effectively and efficiently retain wires of various sizes in place, and in proper alignment with the corresponding terminals, during crimping operations.

BRIEF DESCRIPTION OF THE INVENTION

In an embodiment, a wire clamp is provided that includes a base and a pair of first and second jaws. The base has a first upright portion and a second upright portion, and includes a cavity defined between the first and second upright portions. The first and second jaws are mounted to the base and extend into the cavity. The first jaw is pivotally mounted to the first upright portion via a first pivot axle, and the second jaw is pivotally mounted to the second upright portion via a second pivot axle that is spaced apart laterally from the first pivot axle. The first and second jaws each include a respective hook member. The first and second jaws crisscross each other at an overlap area. The hook members of the first and second jaws define a mouth therebetween that is configured to receive a wire, and the mouth is located above the overlap area. The first and second jaws are spring-biased to pivot relative to the base from an open position towards a closed position. A size of the mouth adjusts automatically to a size of the wire within the mouth when the first and second jaws are allowed to pivot towards the closed position.

In an embodiment, a wire clamp is provided that includes a base and a pair of first and second jaws mounted to the base. The base includes a first upright portion and a second upright portion. The base includes a cavity defined between the first and second upright portions. The base includes a spring mounted to the first upright portion. The first and second jaws extend into the cavity. The first jaw is pivotally mounted to the first upright portion via a first pivot axle, and the second jaw is pivotally mounted to the second upright portion via a second pivot axle that is spaced apart laterally from the first pivot axle. The first and second jaws each include a respective hook member. The first and second jaws crisscross each other at an overlap area. The hook members of the first and second jaws define a mouth therebetween that is configured to receive a wire. The mouth is located above the overlap area. The first jaw is coupled to an associated drive shaft that engages the spring. The spring biases the pair of first and second jaws to pivot relative to the base towards a closed position. As the first and second jaws pivot towards the closed position, a size of the mouth decreases.

In an embodiment, a crimping system is provided that includes a terminal holder configured to receive an electrical terminal thereon, crimp tooling, and a wire clamp. The crimp tooling is mounted to a movable ram and moves with the ram reciprocally towards and away from the terminal holder along a crimp stroke. The crimp tooling is configured to crimp the electrical terminal to an end of a wire during the crimp stroke. The wire clamp is configured to hold the wire in place during a crimping operation. The wire clamp includes a base and a pair of first and second jaws. The first jaw is pivotally mounted to the base via a first pivot axle, and the second jaw is pivotally mounted to the base via a second pivot axle that is spaced apart laterally from the first pivot axle. The first and second jaws each include a respective hook member. The first and second jaws crisscross each other at an overlap area. The wire is held within a mouth defined between the hook members of the first and second jaws. The mouth is located above the overlap area. The first and second jaws are spring-biased to pivot relative to the base such that the hook members are biased towards each other to grip the wire between the hook members and retain an axial position of the wire as the end of the wire is crimped to the electrical terminal.

DETAILED DESCRIPTION OF THE INVENTION

Embodiments of the present disclosure provide a wire clamp for a crimping system that allows for safe, efficient, and reliable crimping of terminals to wires of multiple different sizes. For example, the wire clamp is able to hold and secure the wire during the crimping operation, which allows the user or operator to be remote from the crimping machine 102, reducing the risk of injury. Furthermore, the wire clamp is configured to self-adjust to different wire sizes, which allows for efficient substitution between wires of different sizes. In addition, to securing the wires of different sizes, the wire clamp is also configured maintain alignment with the terminals on the terminal holder. For example, in addition to maintaining left-to-right and axial alignment of the wire to the terminal, the wire clamp may be configured to automatically raise or lower differently-sized wires such that the wires align vertically with the corresponding terminals on the terminal holder. In one or more embodiments, the wire clamp is simple to use. The jaws of the wire clamp are biased towards the closed or gripping position, so a user only has to provide manual effort when opening the jaws to remove and/or insert a wire into the clamp.

Figure 1:
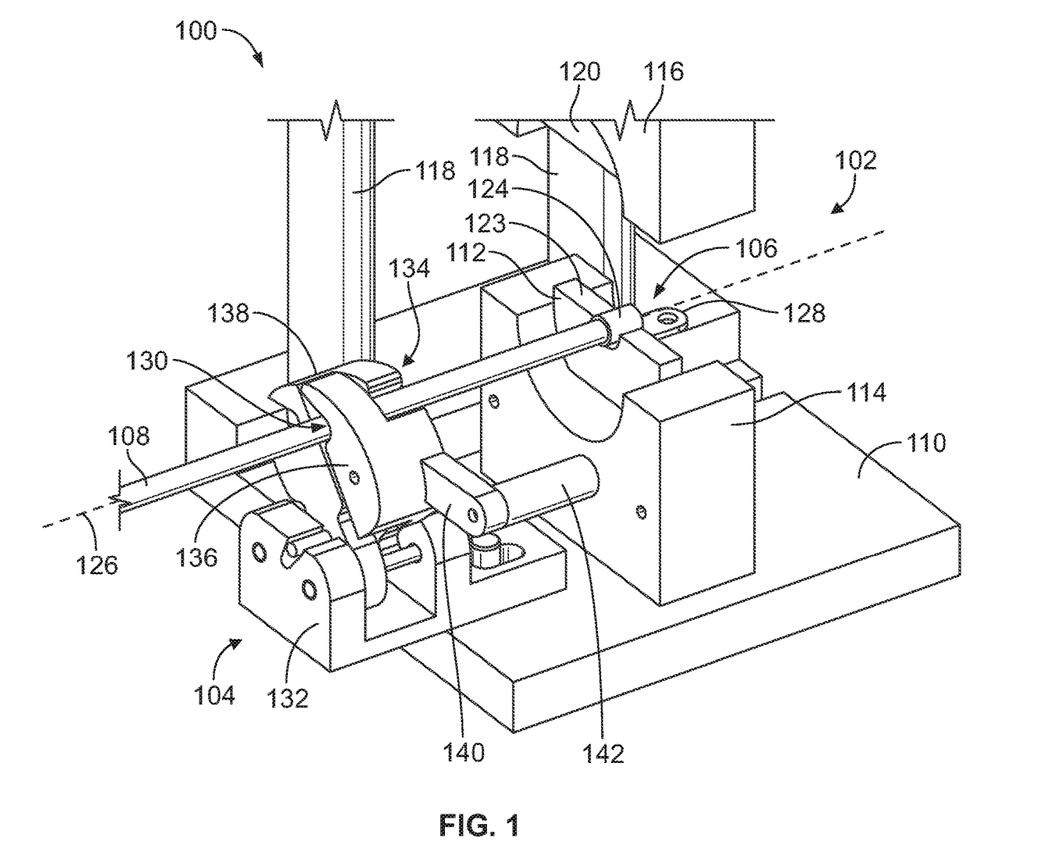
FIG. 1 is a top perspective view of a crimping system formed in accordance with an embodiment.

FIG. 1 is a top perspective view of a crimping system 100 formed in accordance with an embodiment. The crimping system 100 includes a crimping machine 102, such as an applicator or a terminator, and a wire clamp 104 mounted to the crimping machine 102. The crimping machine 102 is configured to crimp a terminal 106 onto a wire 108 during a crimping operation. The crimping machine 102 includes a platform 110, a terminal holder 112 disposed on a terminal base 114 mounted to the platform 110, and a ram 116. The terminal holder 112 receives an electrical terminal 106 along a top 123 of the terminal holder 112. Only a portion of the ram 116 is shown in FIG. 1. The ram 116 is mounted to the platform 110 via support posts 118. The ram 116 is configured to move reciprocally towards and away from the terminal holder 112 (and the platform 110) along a crimp stroke. Crimp tooling 120 is secured to the ram 116 and moves with the ram 116 along the crimp stroke. As the ram 116 moves towards the terminal holder 112, the crimp tooling 120 is configured to engage the terminal 106 and bend, crush, and/or otherwise deform the terminal 106 into fixed engagement with the end of the wire 108 that is on or in the terminal 106, thereby crimping the terminal 106 onto the wire 108.

In the illustrated embodiment, the terminal 106 includes a closed barrel (or ferrule) 124 into which the end of the wire 108 is loaded prior to the crimping operation, while the ram 116 is suspended a distance above the terminal base 114. In an alternative embodiment, the terminal 106 may have an open, U-shaped barrel or the like that receives the wire 108 instead of the closed barrel 124. The terminal 106 also includes a contact segment 128 that extends from the barrel 124, and is configured to electrically connect to a mating component, such as a mating contact, a grounding element, or the like.

The wire 108 in the illustrated embodiment extends along a wire axis 126. The wire axis 126 aligns laterally and vertically (e.g., side-to-side and up-and-down) with the terminal 106. The wire clamp 104 engages the wire 108 at a contact location 130 that is proximate to, but spaced apart from, the terminal holder 112 and the terminal 106 thereon. The wire clamp 104 is configured to hold the wire 108 in alignment with the wire axis 126 to ensure that the wire 108 is in proper alignment with the terminal 106. The wire clamp 104 is also configured to hold the wire 108 in place (e.g., in a fixed position) relative to the terminal 106 during the crimping operation. For example, the wire clamp 104 retains the axial position of the wire 108, reducing the risk of the end of the wire 108 backing at least partially out of the barrel 124 due to the high forces exerted by the crimp tooling 120 on the barrel 124 during the crimping operation.

The wire clamp 104 includes a base 132 and a pair 134 of jaws pivotally mounted to the base 132. The base 132 is mounted to the platform 110 of the crimping machine 102 in the illustrated embodiment, but may be spaced apart from the crimping machine 102 in another embodiment. The wire clamp 104 is located in front of the terminal base 114, and generally aligns with the terminal base 114 along the wire axis 126. The pair 134 of jaws of the wire clamp 104 includes a first jaw 136 and a second jaw 138. The first and second jaws 136, 138 engage the wire 108 from different sides to sandwich the wire 108 between the jaws 136, 138. The first jaw 136 is coupled to a lever 140 that has a handle 142. The handle 142 is configured to be gripped by a user (e.g., operator) to manually move the first jaw 136 towards an open position. The first jaw 136 is coupled to the second jaw 138 by a link 202 (shown in FIG. 4). Movement of the first jaw 136 towards the open position (via the lever 140) causes the second jaw 138 to also pivot towards the open position via the link 202.

As used herein, relative or spatial terms such as "front," "rear," "top," "bottom," "left," "right," "first," and "second," are only used to distinguish the referenced elements of the crimping system 100 and do not necessarily require particular positions or orientations relative to gravity and/or relative to the surrounding environment of the crimping system 100. For example, the designations "first" and "second" with regard to the jaws 136, 138 is only used to identify and distinguish the two jaws 136, 138, not to indicate priority or relative positions in time or space.

As used herein, the open position of the wire clamp 104 is not a specific position in space, but rather refers to a state of the jaws 136, 138 in which the jaws 136, 138 are pivoted away from the wire 108 to allow the wire 108 to be unloaded from the clamp 104 and/or another wire 108 to be loaded into the clamp 104. Thus, the "open position" refers to a state of the jaws 136, 138 in which the jaws 136, 138 do not secure the wire 108 in a fixed position, allowing for loading and unloading of the wire 108. Conversely, a closed position of the wire clamp 104 refers to a state in which the jaws 136, 138 engage and sandwich the wire 108 in a secure hold to retain the position of the wire 108 during a crimping operation. In one or more embodiments, the jaws 136, 138 are spring-biased towards the closed position. Thus, a user may actuate the lever 140 to open the clamp 104 for loading and unloading the wire 108, and the user can simply release the lever 140 to allow the jaws 136, 138 to pivot towards the closed position for securing the wire 108 in place.

Figure 2:
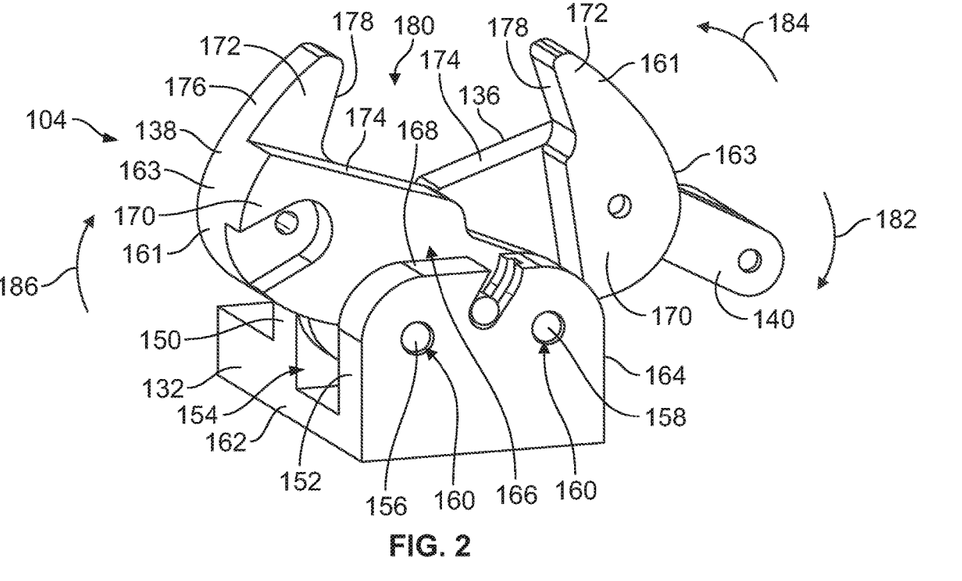
FIG. 2 is a front perspective view of a wire clamp of the crimping system according to an embodiment showing the wire clamp in an open position poised to receive a wire.
Figure 3:
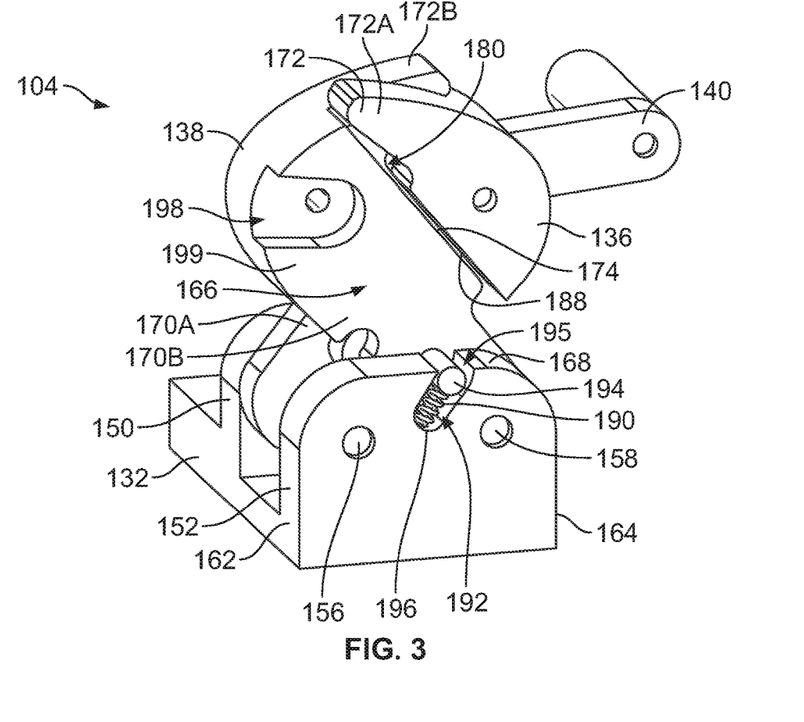
FIG. 3 is a front perspective view of the wire clamp of FIG. 2 showing the wire clamp in a closed position without a wire in the clamp.

FIG. 2 is a front perspective view of the wire clamp 104 of the crimping system 100 according to an embodiment showing the wire clamp 104 in an open position poised to receive a wire. FIG. 3 is a front perspective view of the wire clamp 104 of FIG. 2 showing the wire clamp 104 in a closed position without a wire in the clamp 104.

Referring to FIG. 2, the base 132 includes a first upright portion 150 and a second upright portion 152. The first and second upright portions 150, 152 are spaced apart from each other and define a cavity 154 in the base 132 between the two upright portions 150, 152. The first jaw 136, which is coupled to the lever 140, is pivotally mounted to the first upright portion 150 via a first pivot axle 156. In FIG. 2, an end of the first pivot axle 156 is visible at the second upright portion 152, but the engagement between the first jaw 136, the pivot axle 156, and the first upright portion 150 is not visible in FIG. 2. The second jaw 138 is pivotally mounted to the second upright portion 152 via a second pivot axle 158. The first and second pivot axles 156, 158 are laterally spaced apart from each other. Therefore, the first and second jaws 136, 138 pivot about different axes. In the illustrated embodiment, both the first and second pivot axles 156, 158 engage both of the upright portions 150, 152. For example, each of the pivot axles 156, 158 extends across the cavity 154. In the illustrated embodiment, the pivot axles 156, 158 are visible within holes 160 that extend through the second upright portion 152. Both the first and second jaws 136, 138 extend into the cavity 154. For example, the portions of the jaws 136, 138 that are coupled to the corresponding pivot axles 156, 158 are disposed within the cavity 154, while the portions of the jaws 136, 138 that grip the wire 108 (shown in FIG. 1) are outside of the cavity 154.

Each of the jaws 136, 138 has a body 161 that extends generally from the corresponding pivot axle 156, 158 (at which the jaws 136, 138 are coupled to the base 132) to a distal, free end 163. The first and second jaws 136, 138 crisscross each other along a lateral width of the wire clamp 104 between a left side 162 and a right side 164 of the base 132. For example, the first pivot axle 156 is located proximate to the left side 162, and the second pivot axle 156 is proximate to the right side 164. The first jaw 136 extends from the first pivot axle 156 (proximate to the left side 162) across the width of the base 132 such that the distal end 163 of the first jaw 136 is located beyond the right side 164. Conversely, the second jaw 138 extends from the second pivot axle 158 (proximate to the right side 164) across the base 132 such that the distal end 163 of the second jaw 138 is located beyond the left side 162. The first and second jaws 136, 138 overlap each other along an overlap area 166. In the open position shown in FIG. 2, the overlap area 166 has a width that is approximately equal to the width of the base 132 between the left and right sides 162, 164. The overlap area 166 extends above the tops 168 of the upright portions 150, 152 (although only the top 168 of the second upright portion 152 is visible in FIG. 2).

The body 161 of each of the first and second jaws 136, 138 includes an elongated arm 170 and a hook member 172 that extends from the arm 170. Each arm 170 couples to the corresponding pivot axle 156 or 158, and extends to the respective distal end 163. Thus, the arm 170 may represent a majority of the body 161. Each of the arms 170 includes an inner edge 174 that generally faces upward (away from the base 132) in the open position, as shown, and faces towards the other jaw 136 or 138 in the closed position shown in FIG. 3. In the illustrated embodiment, a length of the inner edge 174 is planar and extends linearly along the length of the arm 170. The hook member 172 is located at, or at least proximate to, the distal end 163. The hook member 172 projects from the inner edge 174 of the respective jaw 136, 138, and may resemble the head of a hammer. The hook member 172 has an outer side 176 and an underside 178 that is generally opposite to the outer side 176. For example, the outer side 176 faces outward. The underside 178 faces generally towards the other jaw 136 or 138 in the open position, as shown, and faces generally downward (towards the base 132) in the closed position shown in FIG. 3.

The hook members 172 of the first and second jaws 136, 138 define a mouth 180 therebetween that is configured to receive a wire (e.g., the wire 108 shown in FIG. 1). The mouth 180 is located above the overlap area 166 and above the tops 168 of the upright portions 150, 152 of the base 132. In the illustrated embodiment, the mouth 180 is at least partially defined by the arms 170 of the jaws 136, 138 in addition to the hook members 172. For example, the mouth 180 in FIG. 2 is defined by the undersides 178 of both hook members 172 and the planar portions of the inner edges 174 of both arms 170. The underside 178 of each hook member 172 is angled relative to the respective inner edge 174 from which the hook member 172 extends. In the illustrated embodiment, the underside 178 is approximately perpendicular to the inner edge 174, and the underside 178 has a slight curve at the intersection between the underside 178 and the inner edge 174. In an alternative embodiment, the underside 178 may extend at an oblique (e.g., non-orthogonal) angle relative to the inner edge 174 and/or there may be a larger curve at the intersection to provide a more gradual transition.

In one or more embodiments, the jaws 136, 138 are spring-biased to move towards the closed position, which is shown in FIG. 3. Thus, the clamp 104 achieves the open position shown in FIG. 2 by forcing the lever 140 in a downward direction 182 with sufficient force to overcome the spring-force on the jaws 136, 138. When the applied downward force on the lever 140 is removed, the jaws 136, 138 are allowed to move towards the closed position. As the jaws 136, 138 move towards the closed position, the jaws 136, 138 pivot in opposite directions relative to the base 132 about the corresponding pivot axles 156, 158. For example, the first jaw 136 pivots in a counter-clockwise direction 184 about the first pivot axle 156, and the second jaw 138 pivots in a clockwise direction 186 about the second pivot axle 158. As the jaws 136, 138 pivot, the hook members 172 move towards each other, and the size of the mouth 180 decreases. For example, at the size of the mouth 180 decreases, the amount of overlap between first and second jaws 136, 138 increases.

Referring now to FIG. 3, there is no wire in the mouth 180 and the jaws 136, 138 are in the closed position. Portions of the jaws 136, 138 engage each other to provide a hard stop surface that blocks additional pivoting of the jaws 136, 138. For example, the inner edge 174 of the second jaw 138 may abut against a ledge 188 of the first jaw 136 proximate to the hook member 172 to provide a hard stop interface. In an embodiment, the jaws 136, 138 are designed and coupled to the base 132 in a manner that permits the jaws 136, 138 to overlap and nest together when closed. For example, the jaws 136, 138 have cut-out regions that receive portions of the other jaw 136, 138 therein. In FIG. 3, the hook members 172 of the two jaws 136, 138 overlap above the mouth 180. For example, the hook member 172A of the first jaw 136 is received in front of the hook member 172B of the second jaw 138. But, along the overlap area 166 (below the mouth 180), the arm 170B of the second jaw 138 is received in front of the arm 170A of the first jaw 136. Thus, as shown in FIG. 2, the inner edge 174 of the second jaw 138 is in front of the inner edge 174 of the first jaw 136. With continued reference to FIG. 2, due to this nesting arrangement, when the clamp 104 grips a wire in the mouth 180, a first location of the wire is sandwiched between the underside 178 of the hook member 172 of the first jaw 136 and the inner edge 174 of the second jaw 138, and an immediately adjacent location of the wire behind the first location is sandwiched between the underside 178 of the hook member 172 of the second jaw 138 and the inner edge 174 of the first jaw 136. When there is no wire within the mouth 180 and the jaws 136, 138 are in the resting closed position, the mouth 180 may be non-existent or very small (e.g., smaller than the diameter of the smaller wire that the clamp 104 is configured to hold).

In an embodiment, when the clamp 104 holds smaller wires, the size of the mouth 180 is smaller than when the clamp 104 holds larger wires. In addition, the amount of overlap of the inner edges 174 of the arms 170A, 170B of the jaws 136, 138 is greater when holding smaller wires than larger wires. For example, as shown in FIG. 2, when the mouth 180 is large, the inner edges 174 have significant non-overlapping lengths that extend between the respective hook members and the overlap area 166.

Referring now back to FIG. 3, the jaws 136, 138 are spring-biased towards the closed position by at least one spring 190 mounted to the base 132. In the illustrated embodiment, the spring 190 is a coil spring that is mounted within a guide slot 192 of the second upright portion 152. The spring 190 may be a different kind of spring in other embodiments, such as a leaf spring, a torsion spring, or the like. The guide slot 192 extends from the top 168 of the upright portion 152 downward at a transverse angle relative to the vertical left and right sides 162, 164 of the base 132. The spring 190 is located within the guide slot 192 such that the spring 190 compresses and extends parallel to the angle of the guide slot 192. The second jaw 138 is coupled to a drive shaft 194 that extends into the guide slot 192 and engages the spring 190. The spring 190 is configured to exert a spring force on the drive shaft 194 in a direction towards an opening 195 of the guide slot 192 at the top 168 of the upright portion 152. When the second jaw 138 is pivoted to the open position, as shown in FIG. 2, the drive shaft 194 forces the spring 190 to compress as the drive shaft 194 moves within the guide slot 192 towards a bottom end 196 of the guide slot 192. The spring 190 in FIG. 2 is recessed within an interior chamber (not shown) of the upright portion 152, and so is not visible. Due to the angle of the guide slot 192 and the orientation of the spring 190 therein, when there is no external applied force present (e.g., from a user engaging the lever 140), the force of the spring 190 on the drive shaft 194 causes the second jaw 138 to pivot in the clockwise direction about the second pivot axle 158.

Although not shown in FIG. 3, in one or more embodiments the first jaw 136 is coupled to a drive shaft that engages a spring mounted to the first upright portion 150 of the base 132. In an alternative embodiment, the spring 190 is the only spring of the clamp 104, and the biasing force applied by the spring 190 on the second jaw 138 is transmitted via a linking mechanism to the first jaw 136, causing the first jaw 136 to pivot about the first pivot axle 156 counter-clockwise towards the closed position. Thus, although one or more embodiments described herein show two springs that separately bias the two jaws 136, 138, in an alternative embodiment the clamp 104 may operate in the same way using only the single spring 190.

Optionally, the second jaw 138 is configured to couple to a lever, such as the lever 140. For example, the second jaw 138 may define a lever recess 198 along a front face 199 of the second jaw 138. The lever recess 198 is sized and shaped to accommodate an end of a lever, which may be secured to the jaw 138 via a fastener, like a bolt. Therefore, the wire clamp 104 is able to accommodate a lever attached to either or both of the jaws 136, 138. In an embodiment, the first and second jaws 136, 138 are identical, neglecting any manufacturing defects. For example, the jaws 136, 138 may have identical sizes and shapes. When the jaws 136, 138 are coupled to the base 132, the first jaw 136 mirrors the second jaw 138. In an alternative embodiment, the jaws 136, 138 are not identical. For example, only one of the jaws 136, 138 may have the lever recess 198 for coupling to the lever 140.

Figure 4:
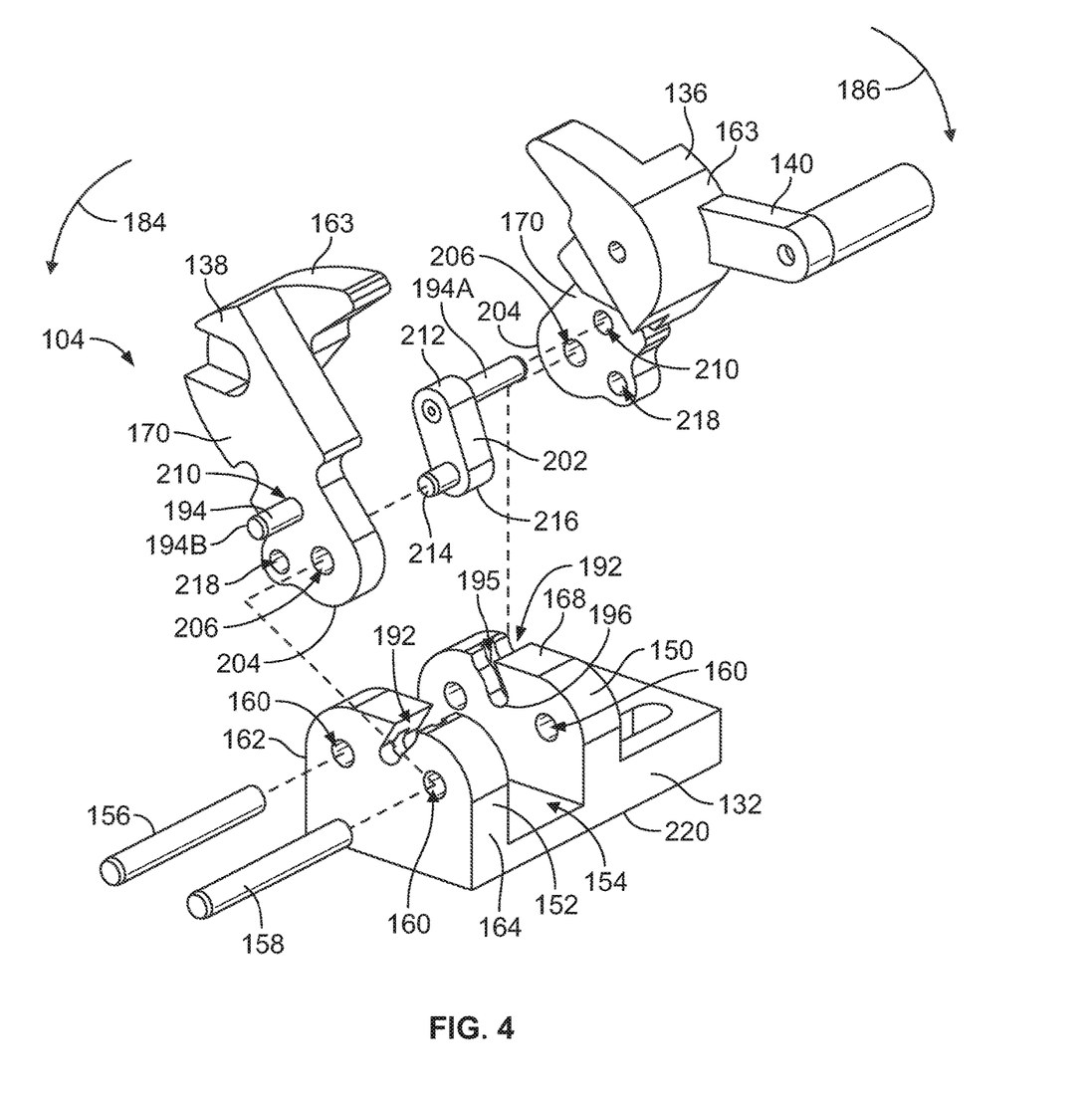
FIG. 4 is an exploded perspective view of the wire clamp according to an embodiment.

FIG. 4 is an exploded perspective view of the wire clamp 104 according to an embodiment. The jaws 136, 138 include mounting ends 204 which are opposite to the distal ends 163. The mounting ends 204 are configured to be pivotally coupled to the base 132 via the corresponding pivot axles 156, 158. When assembled, the mounting ends 204 extend into the cavity 154 of the base 132 between the upright portions 150, 152. The jaws 136, 138 each define a respective pivot aperture 206 proximate to the mounting end 204. The first pivot axle 156 extends through the pivot aperture 206 of the first jaw 136 to pivotally couple the first jaw 136 to the base 132. The second pivot axle 158 extends through the pivot aperture 206 of the second jaw 138 to pivotally couple the second jaw 138 to the base 132. Optionally, the first jaw 136 does not couple to the second pivot axle 158, and the second jaw 138 does not couple to the first pivot axle 156. In one or more embodiments, the pivot axles 156, 158 are discrete shafts. Each of the pivot axles 156, 158 extends into both of the upright portions 150, 152 of the base 132 (e.g., through the holes 160) and through the pivot aperture 206 of a corresponding one of the jaws 136, 138. The pivot axles 156, 158 may extend parallel to each other when assembled. In an alternative embodiment, the pivot axles 156, 158 may be integral with the corresponding jaws 136, 138. For example, the axles 156, 158 may be welded to the jaws 136, 138, forming jaws with integral axles, instead of separate shafts that are removably received into openings in the jaws 136, 138.

In an embodiment, the drive shaft 194 shown in FIG. 3 is associated with the second jaw 138, and the wire clamp 104 also includes a different drive shaft 194 associated with the first jaw 136. The drive shaft 194 associated with the first jaw 136 is referred to herein as a first drive shaft 194A, and the drive shaft 194 associated with the second jaw 138 is a second drive shaft 194B. In an embodiment, the drive shafts 194A, 194B are discrete shafts that are separate components from the jaws 136, 138, like the pivot axles 156, 158. The jaws 136, 138 each define a respective drive hole 210 through the arm 170. The drive holes 210 are spaced apart from the pivot apertures 206. During assembly, the first drive shaft 194A is received through the drive hole 210 of the first jaw 136, and the second drive shaft 194B is received through the drive hole 210 of the second jaw 138. In an alternative embodiment, the drive shafts 194 may be integrally formed with the jaws 136, 138, such as via molding or welding, instead of using discrete shafts inserted into the drive holes 210 of the jaws 136, 138.

The drive shafts 194A, 194B protrude from the corresponding jaws 136, 138 and are received within the guide slots 192 of the upright portions 150, 152 of the base 132. For example, the first drive shaft 194A is received in the guide slot 192 of the first upright portion 150, and the second drive shaft 194B is received in the guide slot 192 of the second upright portion 152. As shown in FIG. 4, the guide slots 192 of the first and second upright portions 150, 152 extend at different angles relative to each other. For example, from the bottom end 196 towards the opening 195 at the top 168, the guide slot 192 of the first upright portion 150 is angled towards the left side 162 of the base 132, and the guide slot 192 of the second upright portion 152 is angled towards the right side 164.

The wire clamp 104 may include a link 202 that is disposed between and connects the two jaws 136, 138. For example, when assembled, the link 202 is located between the arms 170 of the jaws 136, 138 generally along the overlap area 166 (shown in FIG. 2). Due to the link 202, the pivoting of one of the jaws 136, 138 relative to the base 132, such as the first jaw 136 via manual actuation of the lever 140, causes the other jaw to also pivot relative to the base 132. In the illustrated embodiment, the first drive shaft 194A coupled to the first jaw 136 is connected to one end 212 of the link 202. The link 202 includes a linking pin 214 at an opposite end 216 of the link 202. The linking pin 214 couples to the second jaw 138 at a location that is spaced apart from the second drive shaft 194B coupled to the second jaw 138. Thus, the link 202 does not connect the drive shafts 194A, 194B to each other. Rather, the linking pin 214 is received within a linking opening 218 in the second jaw 138. The linking opening 218 is spaced apart from the pivot aperture 206 and the drive hole 210 along the arm 170 of the second jaw 138. Optionally, the arrangement of the link 202 may be reversed, such that the second drive shaft 194B is connected directly to the end 212 of the link 202, and the linking pin 214 couples to the first jaw 136 at a spaced-apart location from the first drive shaft 194A. In the illustrated embodiment, the first and second jaws 136, 138 have an identical size and shape, so the first jaw 136 also includes a linking opening 218. However, when the wire clamp 104 is assembled, the linking opening 218 of either the first jaw 136 or the second jaw 138 is vacant or empty. For example, in the illustrated arrangement shown in FIG. 4, the linking opening 218 of the first jaw 136 will be empty when the wire clamp 104 is assembled.

The link 202 is configured to connect the movement of the jaws 136, 138 such that, for example, when the first jaw 136 is pivoted (e.g., manually by the use of the lever 140) in the clockwise direction 186 about the first pivot axle 156 towards the open position, the linking assembly that includes the drive shaft 194A, the link 202, and the linking pin 214, are forced generally vertically downward towards a bottom side 220 of the base 132. The downward movement of the linking pin 214, which is located within the linking opening 218 of the second jaw 138, causes the second jaw 138 to pivot in the counter-clockwise direction 184 about the second pivot axle 158 towards the open position. The link 202 also connects the pivoting movement of the jaws 136, 138 when the jaws 136, 138 move towards the closed position. For example, although the jaws 136, 138 may be independently spring-biased towards the closed position, the link 202 synchronizes the pivoting movement of the jaws 136, 138 (e.g., at a common speed and distance). The synchronized pivoting of the jaws 136, 138 enables the wire clamp 104 to hold a wire 108 (shown in FIG. 1) along a lateral center of the clamp 104, regardless of the size of the wire 108.

Figure 5:
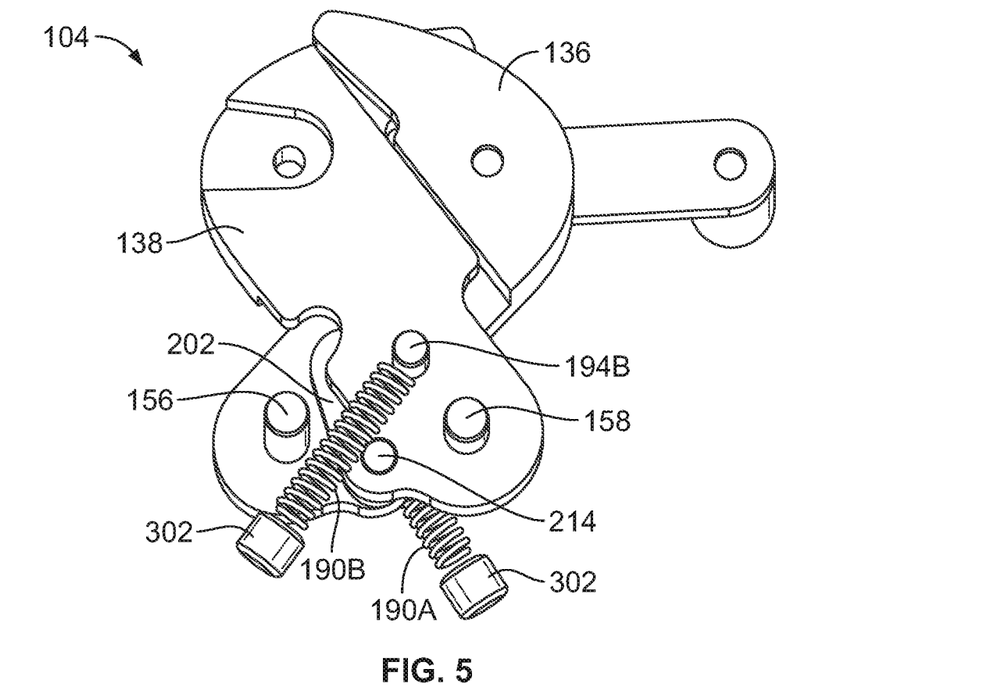
FIG. 5 is a front view of the wire clamp in the closed position shown without a base of the wire clamp according to an embodiment.
Figure 6:
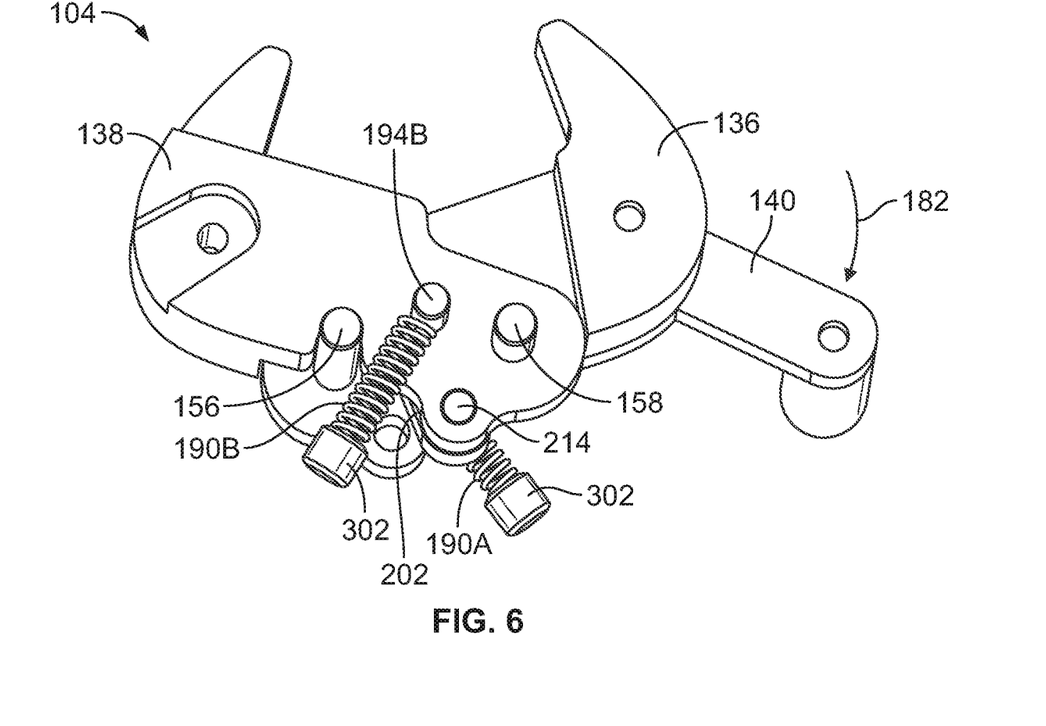
FIG. 6 is a front view of the wire clamp of FIG. 5 in the open position.

FIG. 5 is a front view of the wire clamp 104 in the closed position shown without the base 132 according to an embodiment. FIG. 6 is a front view of the wire clamp 104 of FIG. 5 in the open position. In the illustrated embodiment, the wire clamp 104 includes a first spring 190A and a second spring 190B. The first spring 190A spring-biases the first jaw 136, and the second spring 190B spring-biases the second jaw 138. The second spring 190B is the spring 190 shown in FIG. 3. The first spring 190A engages the first drive shaft 194A (shown in FIG. 4) to bias the first jaw 136 towards the closed position, and the second spring 190B engages the second drive shaft 194B to bias the second jaw 138 towards the closed position. The springs 190A, 190B each extend from the corresponding drive shaft 194A, 194B to a corresponding set screw 302. The set screws 302 are used to adjust the spring-force exerted by the springs 190A, 190B on the drive shafts 194A, 194B, respectively. The spring-forces control the amount of clamp force exerted on the wire 108 (shown in FIG. 1). The set screws 302 are individually adjustable, such as by rotating the set screws 302. Although the base 132 is not shown in FIG. 5, the springs 190A, 190B and the set screws 302 may be mounted to the base 132, such as within interior chambers of the base 132.

The springs 190A, 190B are compressed between the drive shafts 194A, 194B and the set screws 302. In the open position shown in FIG. 6, the springs 190A, 190B are more compressed than the springs 190A, 190B are in the closed position. Thus, the length of the spring 190B shown in FIG. 6 is shorter than the length of the spring 190B in FIG. 5.

In an embodiment, the only illustrated components that do not move between the open and closed positions of the jaws 136, 138 are the pivot axles 156, 158 and the set screws 302. As described above with reference to FIG. 4, the link 202 moves downward as the jaws 136, 138 pivot from the closed position to the open position. For example, the linking pin 214 is approximately aligned with the pivot axles 156, 158, in the closed position shown in FIG. 5, but is located well below the pivot axles 156, 158 in the open position shown in FIG. 6 due to the link 202 being pushed downward as the lever 140 is manually moved in the downward direction 182.

Figure 7:
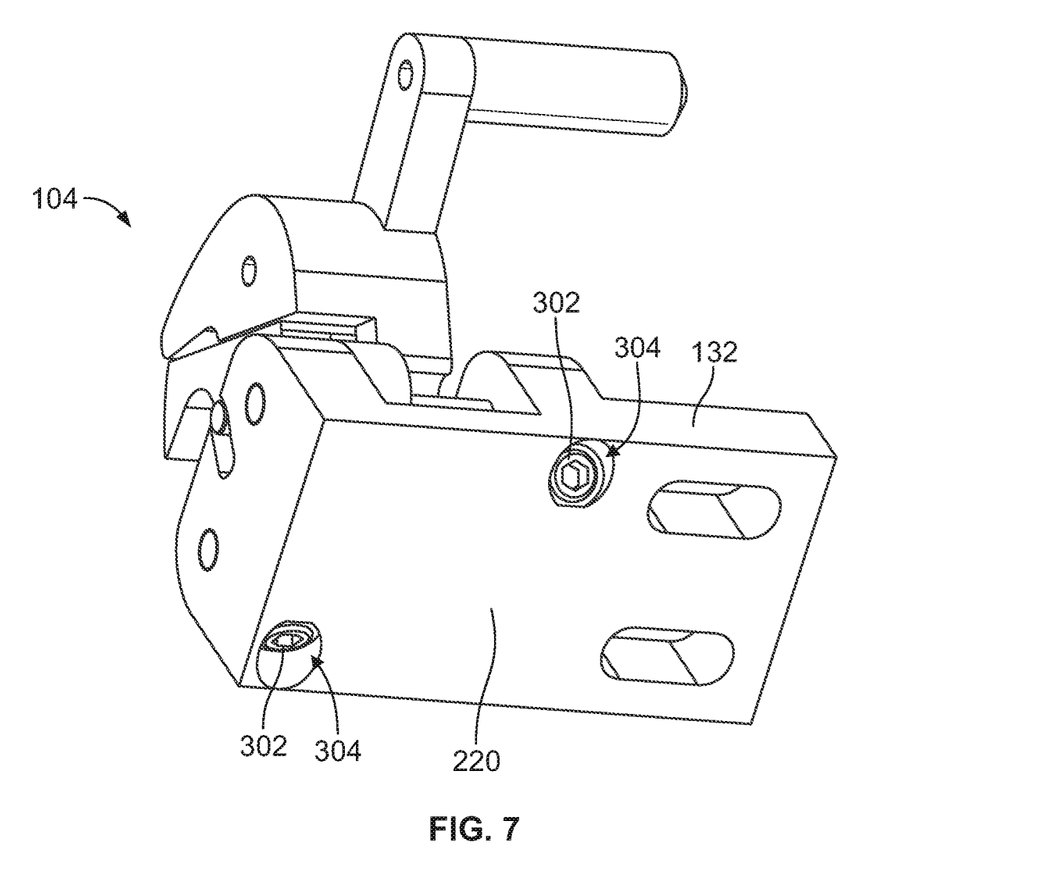
FIG. 7 is a bottom perspective view of the wire clamp according to an embodiment.

FIG. 7 is a bottom perspective view of the wire clamp 104 according to an embodiment. The set screws 302 are mounted within the base 132 along the bottom side 220 of the base 132. The set screws 302 are located within countersunk or counterbored holes 304 of the base 132, and are recessed from the bottom side 220. The set screws 302 are accessible along the bottom side 220 for adjusting the spring-force of the springs 190A, 190B (shown in FIG. 6), and therefore the clamp force of the wire clamp 104. Optionally, the wire clamp 104 may need to be decoupled from the crimping machine 102 (shown in FIG. 1) prior to adjusting the set screws 302 in order to access the set screws 302 on the bottom side 220.

Figure 8:
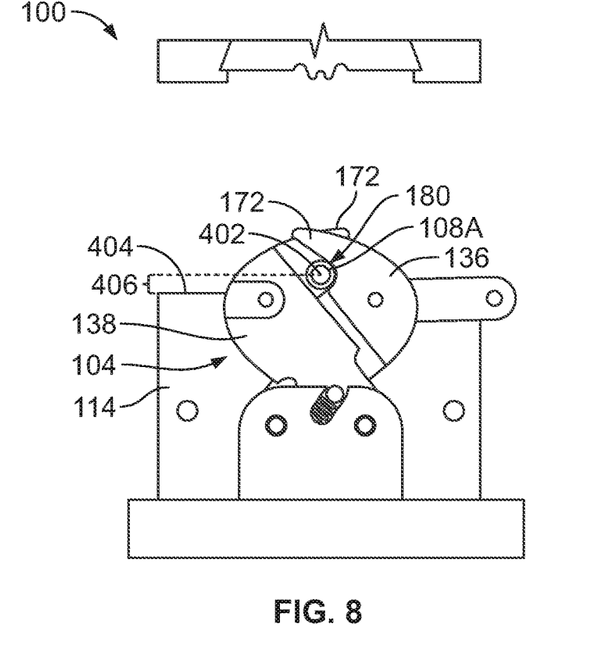
FIG. 8 is a front view of the crimping system showing the wire clamp holding a first wire.
Figure 9:
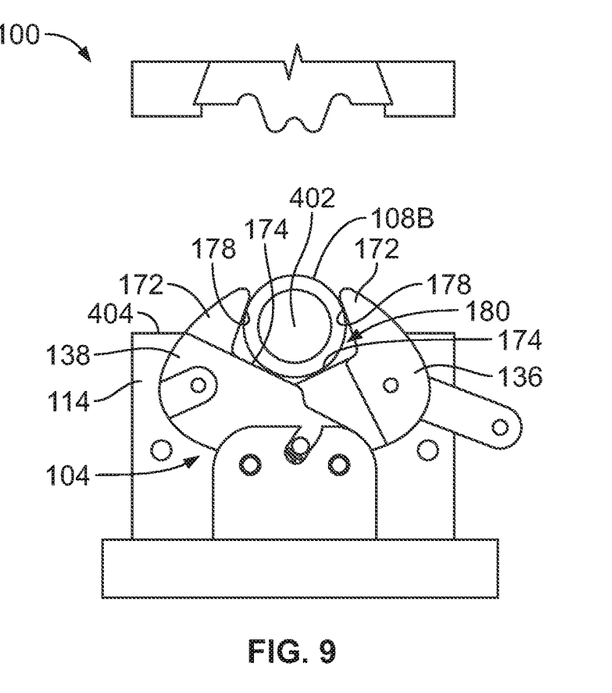
FIG. 9 is a front view of the crimping system showing the wire clamp holding a second wire that is larger than the first wire shown in FIG. 8.

FIG. 8 is a front view of the crimping system 100 showing the wire clamp 104 holding a first wire 108A. FIG. 9 is a front view of the crimping system 100 showing the wire clamp 104 holding a second wire 108B that is larger than the first wire 108A. The second wire 108B has a larger diameter than the diameter of the first wire 108A. The front views in FIGS. 8 and 9 are co-linear with the wire axis 126 (shown in FIG. 1) along the centerlines 402 of the respective wires 108A, 108B, so the first and second wires 108A, 108B are shown in cross-section. In an embodiment, the wire clamp 104 is configured to accommodate wires of various sizes. The wire clamp 104 is able to self-adjust automatically to wires of different sizes without the user having to manually reset parts of the clamp 104 for different sizes of wires. As shown in FIG. 9, the wire clamp 104 is able to self-adjust because, when a wire 108 is loaded into the mouth 180 when the jaws 136, 138 are open and the jaws 136, 138 are allowed to pivot towards the closed position, the wire 108 slides along the inner edges 174 of the jaws 136, 138 until the undersides 178 of the hook members 172 engage the wire 108. At this point, the wire 108 is held in place between the undersides 178 and the inner edges 174 of the two jaws 136, 138, and the wire 108 blocks additional pivoting movement of the jaws 136, 138 towards the closed position.

The wire clamp 104 may be configured to self-adjust to accommodate wires within a range of wire sizes. The range of wire sizes may include wire diameters between about 0.02 inches and about 2.0 inches, such as between about 0.05 inches and about 1.0 inches. For smaller wires, such as the wire 108A shown in FIG. 8, the hook members 172 of the jaws 136, 138 overlap one another across a top of the mouth 180. For larger wires, such as the wire 108B in FIG. 9, the hook members 172 do not overlap due to the size of the mouth 180.

In an embodiment, the smaller wire 108A is held by the wire clamp 104 at least slightly higher (e.g., in a direction away from the base 132) than the larger wire 108B. For example, the centerline 402 of the smaller wire 108A is located above a top 404 of the terminal base 114 by a first distance 406, while the centerline 402 of the larger wire 108B approximately aligns with the top 404 of the terminal base 114. Thus, a center of the mouth 180 of the clamp 104 rises as the jaws 136, 138 move towards the closed position to grip smaller-sized wires. The different heights of the wires 108A, 108B may be provided in order to align the wires 108A, 108B with the positioning of the corresponding terminals 106 (shown in FIG. 1).

Figure 10:
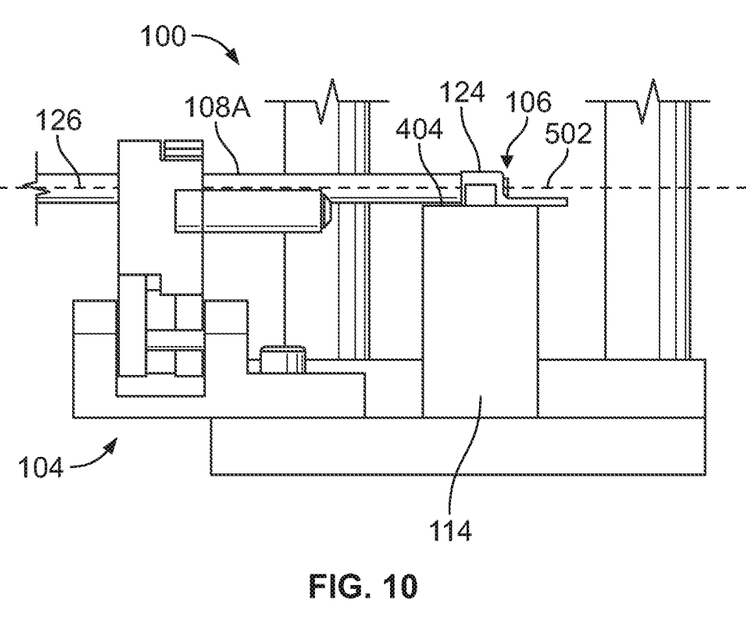
FIG. 10 is a side view of the crimping system according to an embodiment showing the wire clamp holding the smaller wire of FIG. 8.
Figure 11:
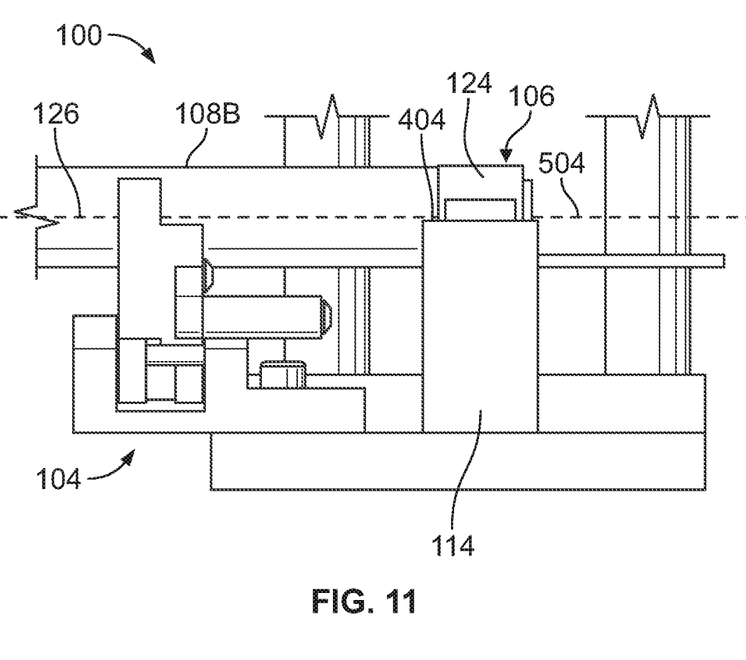
FIG. 11 is a side view of the crimping system according to an embodiment showing the wire clamp holding the larger wire of FIG. 9.

FIG. 10 is a side view of the crimping system 100 according to an embodiment showing the wire clamp 104 holding the smaller wire 108A shown in FIG. 8. FIG. 11 is a side view of the crimping system 100 according to an embodiment showing the wire clamp 104 holding the larger wire 108B shown in FIG. 9. The wire clamp 104 is configured to hold the corresponding wires 108A, 108B in an orientation that allows the wires 108A, 108B to align with the corresponding terminals 106. For example, the wire axis 126 of the smaller wire 108A in FIG. 10 is collinear with a respective axis 502 of the barrel 124 of the terminal 106A held on the terminal base 114. Similarly, the wire axis 126 of the larger wire 108B in FIG. 11 is collinear with a respective axis 504 of the barrel 124 of the terminal 106B held on the terminal base 114. As described in FIGS. 8 and 9, the wire axis 126 of the smaller wire 108A shown in FIG. 10 is disposed a greater distance above the top 404 of the terminal base 114 than the wire axis 126 of the larger wire 108B shown in FIG. 11. Thus, the wire clamp 104 is configured to accommodate different wire sizes within the designated wire range without requiring adjustment, and the wire clamp 104 is also configured to automatically orient the wires of different sizes in-line with the corresponding terminals 106. Holding the wires 108A, 108B in-line with the corresponding terminals 106 reduces the risk of producing misaligned electrical leads, which may not meet crimp specifications.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely example embodiments. Many other embodiments and modifications within the spirit and scope of the claims will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A wire clamp comprising:
a base including a first upright portion and a second upright portion; and
a pair of first and second jaws mounted to the base, the first jaw pivotally mounted to the first upright portion via a first pivot axle, the second jaw pivotally mounted to the second upright portion via a second pivot axle that is spaced apart laterally from the first pivot axle, the first and second jaws each including a respective hook member, the first and second jaws crisscrossing each other at an overlap area, the hook members of the first and second jaws defining a mouth between the first and second jaws that is configured to receive a wire, wherein the overlap area is disposed below the mouth and above the first and second pivot axles,
wherein the first jaw is coupled to a first drive shaft and the second jaw is coupled to a second drive shaft, the first drive shaft extends from the first jaw and is coupled to a first spring mounted to the first upright portion of the base, the second drive shaft extends from the second jaw and is coupled to a second spring mounted to the second upright portion of the base, the first and second springs biasing the first and second jaws, via the first and second drive shafts, respectively, to pivot relative to the base from an open position towards a closed position, and wherein a size of the mouth adjusts automatically to a size of the wire within the mouth when the first and second jaws are allowed to pivot towards the closed position.

2. The wire claim of claim 1, wherein, as the first and second jaws pivot towards the closed position, the first and second jaws pivot in opposite directions about the corresponding first and second pivot axles.

3. The wire claim of claim 1, wherein the hook members of the first and second jaws are configured to overlap one another across a top of the mouth as the first and second jaws pivot towards the closed position.

4. The wire claim of claim 1, further comprising a lever mounted to the first jaw via a fastener that extends through both the lever and the first jaw, the lever including a handle configured to be gripped by an operator to manually move the first and second jaws towards the open position for loading and unloading the wire in the mouth.

5. The wire claim of claim 1, wherein the first drive shaft is connected to one end of a link, the link including a linking pin at an opposite end of the link, the linking pin coupling to the second jaw at a location spaced apart from the second drive shaft.

6. The wire clamp of claim 5, wherein the link is disposed between the first and second jaws and spaced apart from the mouth, wherein the link synchronizes the pivoting movement of the first and second jaws.

7. The wire claim of claim 1, wherein the first and second springs are each coupled to a different, corresponding set screw within the base, the set screws being adjustable to selectively control an amount of spring-biasing force exerted on the respective first and second jaws via the first and second drive shafts.

8. The wire claim of claim 1, wherein the first and second jaws have identical sizes and shapes.

9. The wire claim of claim 1, wherein the size of the mouth is configured to adjust automatically to the size of the wire within the mouth when a diameter of the wire is between about 0.05 inches and about 1.0 inch.

10. The wire clamp of claim 1, wherein the first spring and the first drive shaft are disposed within a guide slot defined in the first upright portion of the base.

11. A wire clamp comprising:
a base including a first upright portion and a second upright portion; and
a pair of first and second jaws mounted to the base, the first jaw pivotally mounted to the first upright portion via a first pivot axle, the second jaw pivotally mounted to the second upright portion via a second pivot axle that is spaced apart laterally from the first pivot axle, the first and second jaws each including a respective hook member, the first and second jaws crisscrossing each other at an overlap area, the hook members of the first and second jaws defining a mouth between the first and second jaws that is configured to receive a wire, the mouth located above the overlap area,
wherein the first jaw is coupled to a first drive shaft and the second jaw is coupled to a second drive shaft, the first drive shaft extends from the first jaw and is coupled to a first spring mounted to the first upright portion of the base, the second drive shaft extends from the second jaw and is coupled to a second spring mounted to the second upright portion of the base, the first and second springs biasing the first and second jaws, via the first and second drive shafts, respectively, to pivot relative to the base from an open position towards a closed position, and wherein a size of the mouth adjusts automatically to a size of the wire within the mouth when the first and second jaws pivot towards the closed position,
wherein the first jaw is connected to the second jaw via a link and pivoting of the first jaw relative to the base causes the second jaw to pivot relative to the base via the link.

12. The wire clamp of claim 11, wherein the overlap area is disposed between the mouth and the first and second pivot axles.

13. The wire clamp of claim 11, further comprising a lever mounted to the first jaw via a fastener, the lever including a handle for manually opening the first and second jaws.

14. The wire clamp of claim 11, wherein one end of the link is connected to the first drive shaft and an opposite end of the link is connected to a linking pin that is coupled to the second jaw at a location spaced apart from the second drive shaft.

15. The wire clamp of claim 11, wherein the first spring and the first drive shaft are disposed within a guide slot defined in the first upright portion of the base.

16. A wire clamp comprising:
a base including a first upright portion and a second upright portion; and
a pair of first and second jaws mounted to the base, the first jaw pivotally mounted to the first upright portion via a first pivot axle, the second jaw pivotally mounted to the second upright portion via a second pivot axle that is spaced apart laterally from the first pivot axle, the first and second jaws each including a respective hook member, the first and second jaws crisscrossing each other at an overlap area, the hook members of the first and second jaws defining a mouth between the first and second jaws that is configured to receive a wire, the mouth located above the overlap area,
wherein the first jaw is coupled to a first drive shaft and the second jaw is coupled to a second drive shaft, the first drive shaft extends from the first jaw and is coupled to a first spring mounted to the first upright portion of the base, the second drive shaft extends from the second jaw and is coupled to a second spring mounted to the second upright portion of the base, the first and second springs biasing the first and second jaws, via the first and second drive shafts, respectively, to pivot relative to the base from an open position towards a closed position, and wherein, as the first and second jaws pivot from the open position towards the closed position, a size of the mouth decreases and a center of the mouth moves in a direction away from the base.

17. The wire clamp of claim 16, wherein the overlap area is disposed between the mouth and the first and second pivot axles.

18. The wire clamp of claim 16, wherein the first jaw is connected to the second jaw via a link and pivoting of the first jaw relative to the base causes the second jaw to pivot relative to the base via the link.

19. The wire clamp of claim 16, further comprising a lever mounted to the first jaw via a fastener, the lever including a handle for manually opening the first and second jaws.

20. The wire clamp of claim 16, wherein the first spring and the first drive shaft are disposed within a guide slot defined in the first upright portion of the base.

* * * * *